United States Patent
Chen et al.

(10) Patent No.: US 12,137,036 B2
(45) Date of Patent: Nov. 5, 2024

(54) SYSTEM, METHOD AND COMPUTER-READABLE MEDIUM FOR QUALITY PREDICTION

(71) Applicant: 17LIVE Japan Inc., Tokyo (JP)

(72) Inventors: Li-Han Chen, Taipei (TW); Jin-Wei Liu, Taipei (TW); Yi-Hsiung Chen, Taipei (TW); Yung-Chi Hsu, Taipei (TW)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 17/941,721

(22) Filed: Sep. 9, 2022

(65) Prior Publication Data
US 2023/0403205 A1  Dec. 14, 2023

(30) Foreign Application Priority Data
Jun. 10, 2022 (JP) .................... 2022-094472

(51) Int. Cl.
  *H04L 41/16* (2022.01)
  *H04L 41/147* (2022.01)
  *H04L 43/0852* (2022.01)

(52) U.S. Cl.
  CPC ............ *H04L 41/16* (2013.01); *H04L 41/147* (2013.01); *H04L 43/0852* (2013.01)

(58) Field of Classification Search
  CPC .......................... H04L 41/16; H04L 41/147
  See application file for complete search history.

(56) References Cited

U.S. PATENT DOCUMENTS

| | | | |
|---|---|---|---|
| 2012/0202538 A1* | 8/2012 | Uusitalo | H04B 17/3912 |
| | | | 455/500 |
| 2019/0334786 A1* | 10/2019 | Dutta | G06F 18/2135 |
| 2019/0385045 A1 | 12/2019 | Poovalapil et al. | |
| 2021/0014301 A1* | 1/2021 | Doshi | H04L 67/10 |
| 2022/0210028 A1* | 6/2022 | Chen | H04L 41/0896 |
| 2022/0268827 A1* | 8/2022 | Sun | G01R 31/088 |
| 2022/0303331 A1* | 9/2022 | Svennebring | H04N 21/44209 |
| 2022/0413993 A1* | 12/2022 | Farinas | G06N 3/084 |
| 2023/0153602 A1* | 5/2023 | Truong | G06N 20/20 |
| | | | 706/12 |

OTHER PUBLICATIONS

Notification of Reasons for Refusal dated Oct. 4, 2022 issued in corresponding Japanese Patent Application No. 2022-094472 with English translation (6 pgs.).

* cited by examiner

*Primary Examiner* — Bryan Y Lee
(74) *Attorney, Agent, or Firm* — Pillsbury Winthrop Shaw Pittman, LLP

(57) ABSTRACT

The present disclosure relates to a system, a method and a computer-readable medium for quality prediction. The method includes obtaining values of a parameter of a first endpoint, obtaining values of a parameter of a second endpoint, and generating a prediction of the parameter of the first endpoint according to the values of the parameter of the first endpoint and the values of the parameter of the second endpoint. The prediction includes probability distribution information of the parameter of the first endpoint at a timing in the future. The present disclosure can result in a more precise quality prediction.

6 Claims, 9 Drawing Sheets

| Endpoint data table 310 | |
|---|---|
| Endpoint | Latency data (time series latency value) |
| EP1 | [60ms, 150ms, 400ms, ...] |
| EP2 | [1000ms, 1300ms, 780ms, ...] |
| EP3 | ... |

FIG. 5

System data table 312

| Endpoint | Service group | Pod numbers |
|---|---|---|
| EP1 | G1 | 8 |
| EP2 | G1 | 8 |
| EP3 | G2 | 6 |
| EP4 | G3 | 10 |
| EP5 | G3 | 10 |
| EP6 | G3 | 10 |

FIG. 6

Threshold table 316

| Endpoint | Threshold value of latency |
|---|---|
| EP1 | 700ms |
| EP2 | 1500ms |
| EP3 | ... |

FIG. 8

SYSTEM, METHOD AND COMPUTER-READABLE MEDIUM FOR QUALITY PREDICTION

CROSS-REFERENCE TO RELATED APPLICATIONS

This application is based on and claims the benefit of priority from Japanese Patent Application Serial No. 2022-094472 (filed on Jun. 10, 2022), the contents of which are hereby incorporated by reference in its entirety.

TECHNICAL FIELD

The present disclosure relates to quality prediction and, more particularly, to quality prediction for a server.

BACKGROUND

Realtime data sharing on the Internet has become popular in our daily life. There are various platforms or providers providing the service of live streaming data such as live streaming video, and the competition is fierce. As a live streaming platform becomes popular and is accessed by more and more users, it is important to manage the server and keep the service quality stable.

SUMMARY

A method according to one embodiment of the present disclosure is a method for quality prediction being executed by one or a plurality of computers, and includes: obtaining values of a parameter of a first endpoint, obtaining values of a parameter of a second endpoint, and generating a prediction of the parameter of the first endpoint according to the values of the parameter of the first endpoint and the values of the parameter of the second endpoint. The prediction includes probability distribution information of the parameter of the first endpoint at a timing in the future.

A system according to one embodiment of the present disclosure is a system for quality prediction that includes one or a plurality of computer processors, and the one or plurality of computer processors execute a machine-readable instruction to perform: obtaining values of a parameter of a first endpoint, obtaining values of a parameter of a second endpoint, and generating a prediction of the parameter of the first endpoint according to the values of the parameter of the first endpoint and the values of the parameter of the second endpoint. The prediction includes probability distribution information of the parameter of the first endpoint at a Liming in the future.

A computer-readable medium according to one embodiment of the present disclosure is a non-transitory computer-readable medium including a program for quality prediction, and the program causes one or a plurality of computers to execute: obtaining values of a parameter of a first endpoint, obtaining values of a parameter of a second endpoint, and generating a prediction of the parameter of the first endpoint according to the values of the parameter of the first endpoint and the values of the parameter of the second endpoint. The prediction includes probability distribution information of the parameter of the first endpoint at a Liming in the future.

BRIEF DESCRIPTION OF THE DRAWINGS

FIG. 5 shows an example of the endpoint data table 310.

FIG. 6 shows an example of the system data table 312.

FIG. 8 shows an example of the threshold table 316.

DETAILED DESCRIPTION

One crucial feature in server management is the prediction of service quality or server status. Due to the prediction result, appropriate precautions can be made to prevent or to alleviate the potential issues. Conventional methods of service quality prediction face some challenges that need to be addressed.

Conventionally, different endpoints of the server are treated separately in the prediction process. That is, a status of a specific endpoint is predicted with past behavior or data of that specific endpoint.

Conventionally, an issue of concern is often predicted by other parameters that may have an impact on the issue. For example, parameters such as query per second (QPS) or bandwidth are used to predict issues that are of more direct concern, such as latency.

The present disclosure discloses methods and systems to predict statuses of endpoints by incorporating cross impacts between different endpoints. The present disclosure discloses methods and systems to predict an issue with past behaviors of the issue itself, which is more direct and can lead to more precise results. In some embodiments of the present disclosure, the issue of concern is latency of an endpoint.

Figure 1:
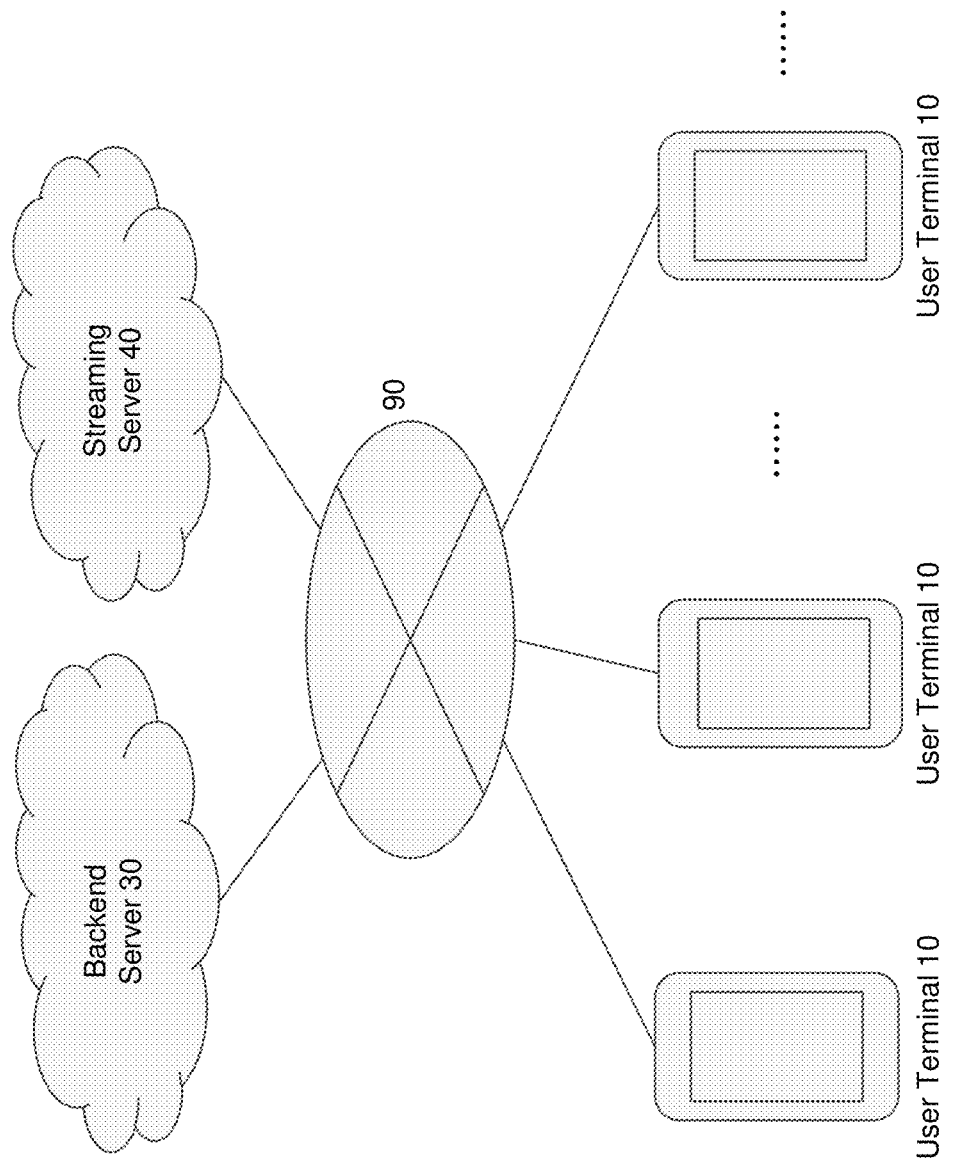
FIG. 1 shows a schematic configuration of a communication system according to some embodiments of the present disclosure.

FIG. 1 shows a schematic configuration of a communication system according to some embodiments of the present disclosure.

The communication system 1 may provide a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/or the streaming server 40. In some embodiments, the backend server 30 may be referred to as the server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming service. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

Figure 9:
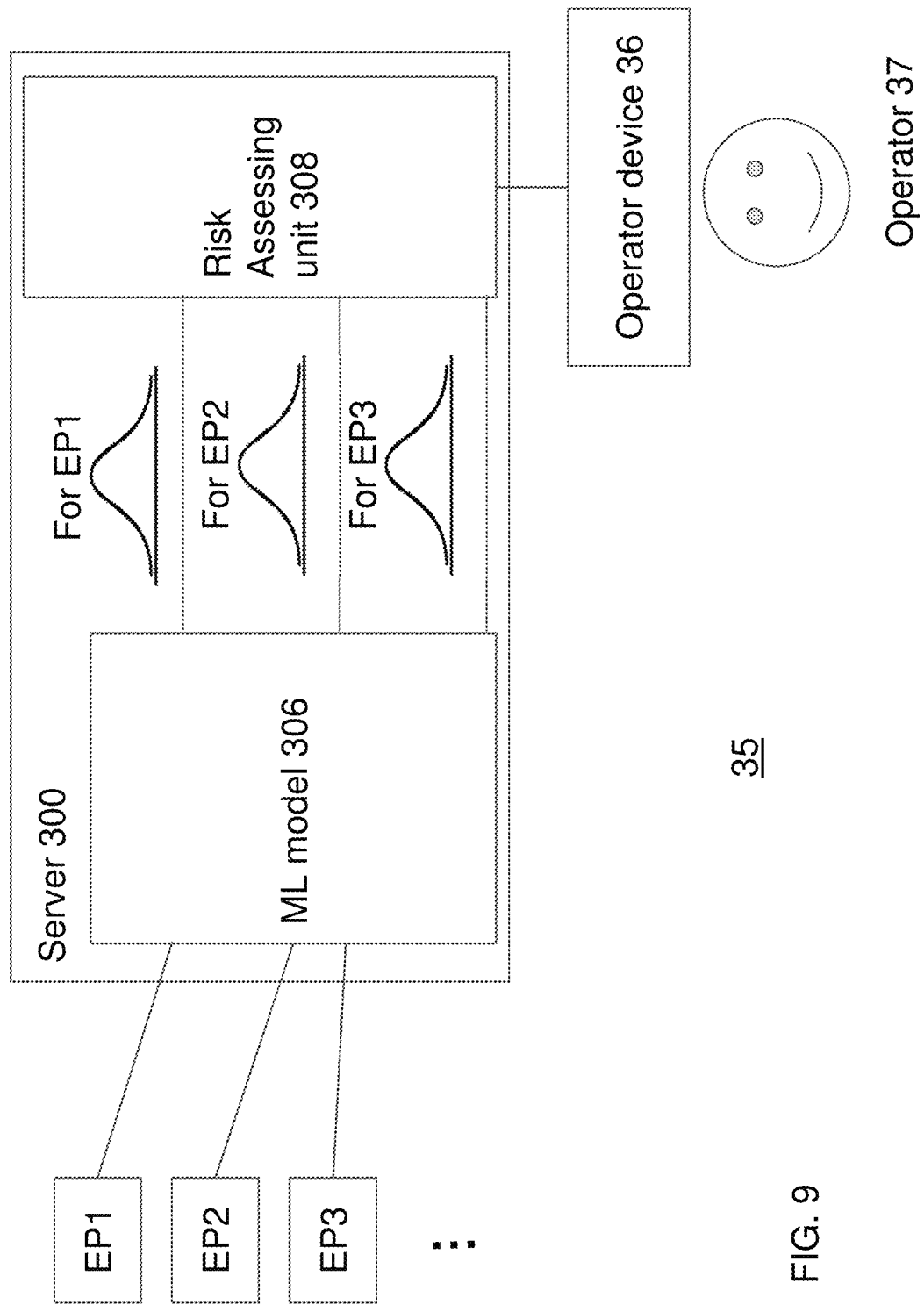
FIG. 9 shows an exemplary block diagram of a backend system 35 of the communication system 1 in accordance with some embodiments of the present disclosure.

FIG. 9 shows an exemplary block diagram of a backend system 35 of the communication system 1 in accordance with some embodiments of the present disclosure. The backend system 35 monitors the latencies of a plurality of endpoints (APIs or servers) and sends an operator a warning message regarding a specific endpoint if predicted results of latency of the specific endpoint satisfy a warning condition. The backend system 35 comprises a plurality of endpoints EP1, EP2, EP3, . . . , a server 300 and an operator device 36. Each endpoint generates time-series latency data and transmits the generated time-series latency data to the server 300 via a network. There is one machine-learning model 306 in the server 300. The model 306 receives the generated time-series latency data from the plurality of the endpoints EP1, EP2, EP3, . . . . The model 306 processes the received data and generates a probability density function for the latency of each of the plurality of endpoints. For example, the model 306 generates a probability density function for the latency of endpoint EP1, a probability density function for the latency of endpoint EP2, and a probability density function for the latency of endpoint EP3. In the process in the model 306, the latency data from different endpoints are correlated with each other. The risk assessing unit 308 of the server 300 receives the probability density functions of the latencies of the plurality of endpoints from the model 306. The risk assessing unit 308 determines whether, for each of the endpoints, the prediction result or the probability density function for the respective endpoint satisfies the warning condition or not. If the warning condition is satisfied for a specific endpoint, the risk assessing unit 308 generates a warning message regarding the specific endpoint and sends the warning message to the operator device 36 via a network. The operator 37 watches the warning message on the operator device 36 and will take an appropriate action on the specific endpoint.

Figure 2:
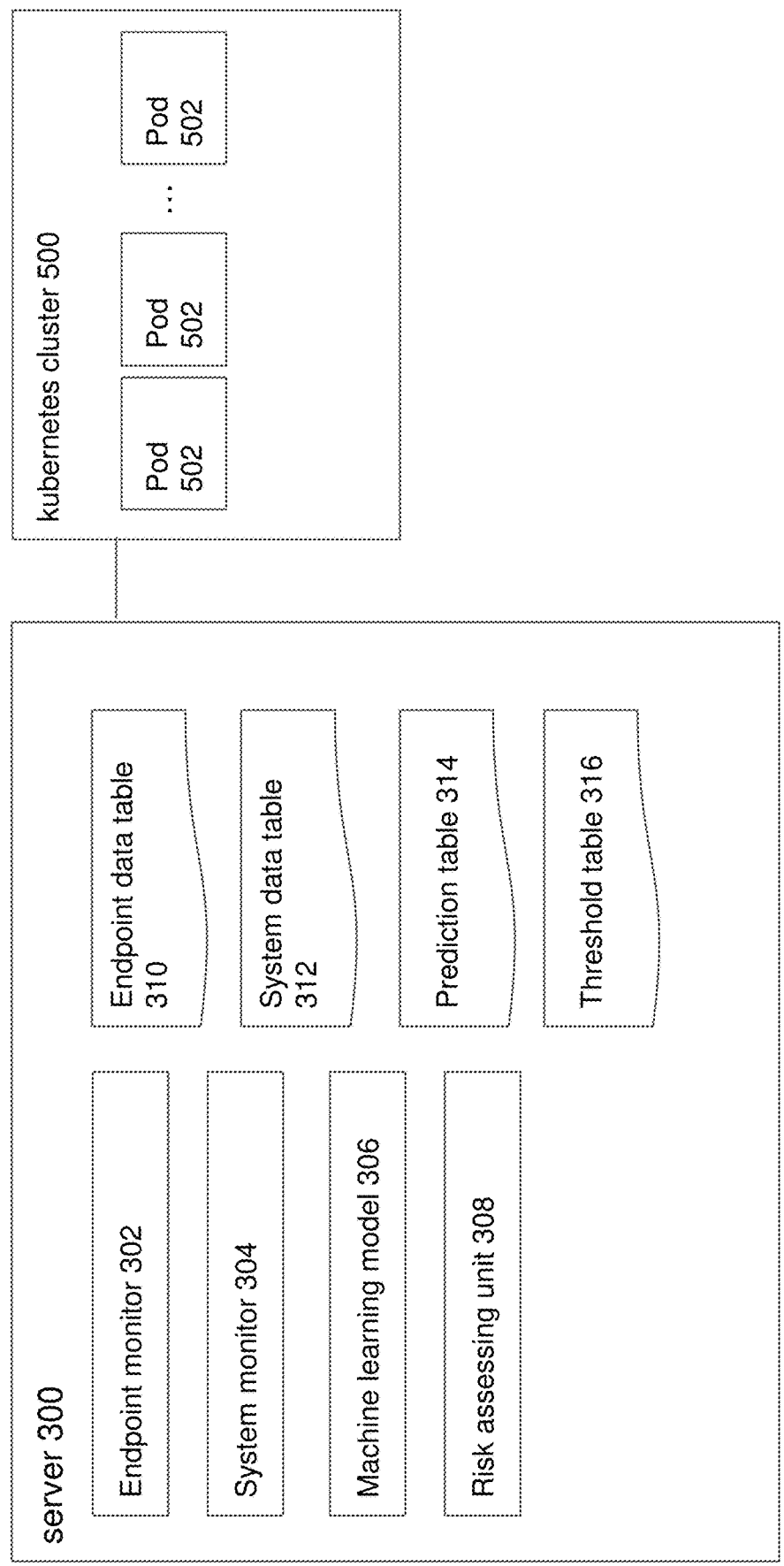
FIG. 2 shows an exemplary block diagram of a server and a kubernetes cluster in accordance with some embodiments of the present disclosure.

FIG. 2 shows an exemplary block diagram of the server 300 and a kubernetes cluster in accordance with some embodiments of the present disclosure.

The server 300 includes an endpoint monitor 302, a system monitor 304, the machine learning model 306, the risk assessing unit 308, an endpoint data table 310, a system data table 312, a prediction table 314 and a threshold table 316. In this embodiment, the server 300 communicates with a kubernetes cluster 500 outside the server 300. The kubernetes cluster includes various pods 502.

Kubernetes or a kubernetes cluster is an open-source container orchestration system for automating software deployment, scaling, and management. A kubernetes cluster includes various pods which are virtual spaces or virtual machines allocated for running an application provided by a server, such as a live streaming application.

In other embodiments, virtual spaces or virtual machines configured to run the live streaming platform provided by the server 300 could be deployed within the server 300. In some embodiments, virtual spaces or virtual machines configured to run the live streaming platform provided by the server 300 could be deployed on other services such as AWS Fargate, Azure Container Instances or Google Cloud Run.

The endpoint monitor 302 is configured to receive information or parameters of endpoints of the live streaming service. The information may include latencies of endpoints. In some embodiments, the information is received from the kubernetes cluster 500. In some embodiments, an endpoint corresponds to an application programming interface (API) of the live streaming service. For live streaming service, there could be various endpoints. For example, a comment endpoint may correspond to the comment feature in a chat room. A gift endpoint may correspond to the gift sending feature in a chat room. An event endpoint may correspond to the event associated with a live streaming program.

The system monitor 304 is configured to monitor or receive system parameters of the server 300 or the kubernetes cluster 500. The parameters may include the number of pods (or pod amount) allocated in the kubernetes cluster 500 for running or supporting the live streaming service. In some embodiments, pods allocated for the live streaming service are pods allocated for (or corresponding to) the endpoints of the live streaming service. In some embodiments, more pods allocated to the endpoints means lower latencies for the endpoints.

The machine learning model 306 is configured to predict states of endpoints, such as latencies of endpoints. The machine learning model 306 may be trained by historical data of the endpoints, such as historical latency values of the endpoints. The machine learning model 306 may be trained by historical data of the pod numbers, such as historical pod amounts corresponding to the endpoints. In some embodiments, the machine learning model 306 takes time series latency data of endpoints and the pod amount information as input (for example, past 30 minutes data of latency and pod amount), and delivers prediction of latencies of the endpoints as output. In some embodiments, the prediction may include probability distribution information of the latency of an endpoint in a future timing. The probability distribution information may include or may be probability density function or probability distribution function of the latency of an endpoint in a future timing, such as, 10 minutes later. In some embodiments, a probability density function may be expressed or defined by a mean and a variance. In some embodiments, a probability density function may conform to a normal distribution.

The risk assessing unit 308 is configured to calculate the probability of risk for an endpoint. For example, the risk assessing unit 308 calculates a probability of outage for an endpoint according to a predetermined threshold value (latency value) and the probability density function of the latency of the endpoint. The threshold value of latency can be determined such that high probability of outage may occur for the endpoint to reach the latency value.

The endpoint data table 310 is configured to store data monitored or received by the endpoint monitor 302. The data may be the time series latency values of each endpoint.

The system data table 312 is configured to store data monitored or received by the system monitor 304. The data may be pod numbers or pod amount information.

The prediction table 314 is configured to store prediction results generated by the machine learning model 306. The result may include mean, variance (or standard deviation) and distribution information (such as normal distribution or gaussian distribution).

The threshold table 316 is configured to store predetermined threshold values for the endpoints. The threshold values may be latency values. Threshold values may be determined by the operator of the live streaming system based on experience or experiments.

Figure 3:
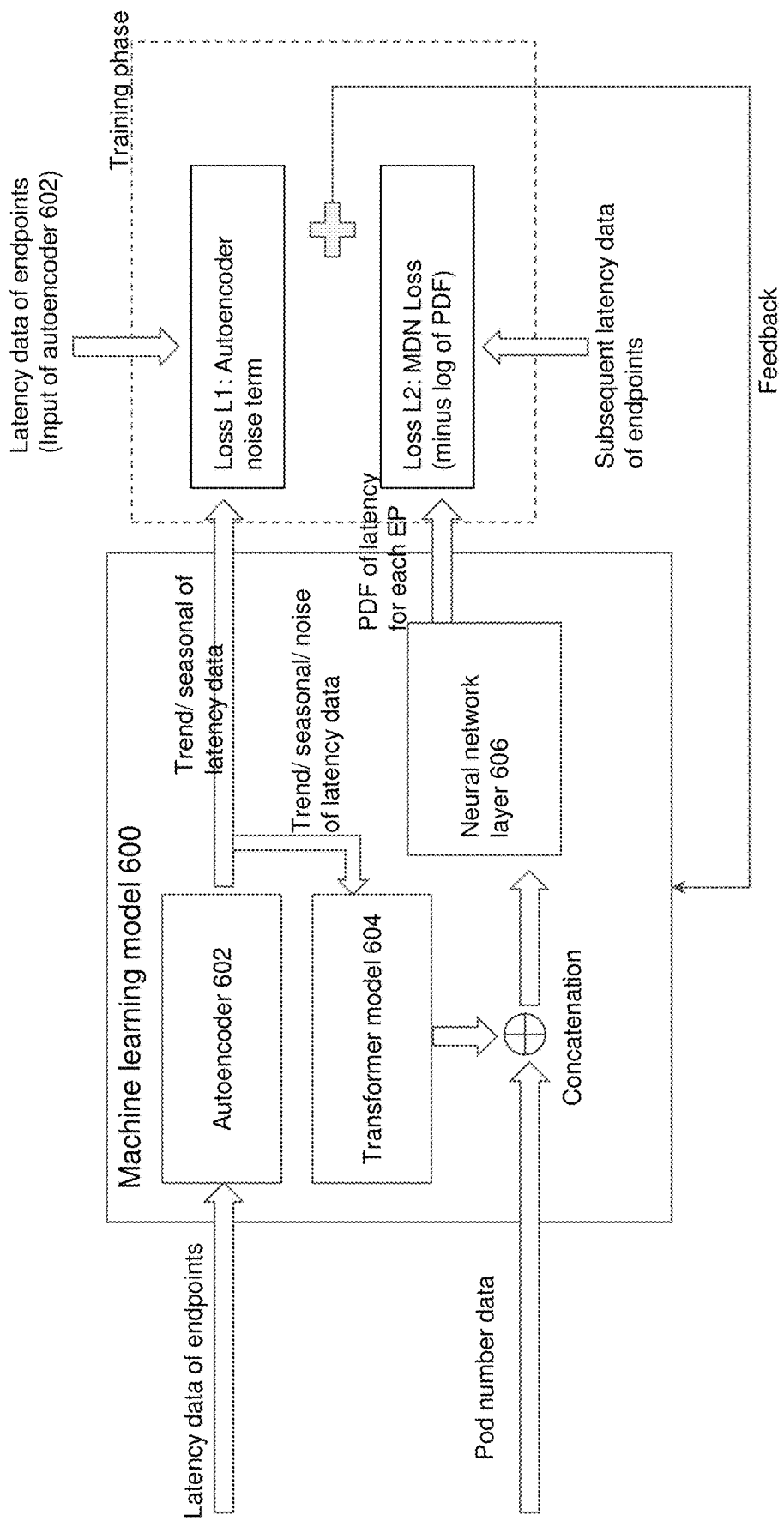
FIG. 3 shows an exemplary machine learning model in accordance with some embodiments of the present disclosure.

FIG. 3 shows an exemplary machine learning model in accordance with some embodiments of the present disclosure. In some embodiments, the machine learning model 600 may be applied as the machine learning model 306 in FIG. 2. The machine learning model 600 includes an autoencoder 602, a transformer model 604 and a neural network layer 606.

The input to the machine learning model 600 are latency data of endpoints and pod number data. The time series latency data of each endpoint is input into the autoencoder 602. In some embodiments, the time series latency data includes latency values (expressed in time series) for each endpoint for a period of time. The pod number data may include the total pod number corresponding to (or allocated to) the total endpoints (for example, total live streaming endpoints). The pod number data may include the pod numbers corresponding to (or allocated to) different endpoint groups. An endpoint group may contain several endpoints corresponding to the same service or the same feature. An endpoint group may be referred to as a service group in some embodiments.

The autoencoder 602 is configured to extract a trend portion, a seasonal portion (or periodical portion) and a noise portion from the latency data of the endpoints. In this embodiment, the trend portion and the seasonal portion of the latency data are one output of the machine learning model 600. In some embodiments, the autoencoder 602 is configured to remove noise data from the latency data, and deliver the "noise removed" latency data as output. The trend portion, the seasonal portion and the noise portion extracted from the latency data are taken as input into the transformer model 604. In some embodiments, the autoencoder 602 is a variational autoencoder. In some embodiments, the noise portion of the latency data may be an anomaly portion or an outlier portion of the latency data. In some embodiments, the autoencoder 602 is configured to extract information in the latent space from the latency data of each endpoint. In some embodiments, the noise portion is defined as (original latency data−(trend portion+seasonal portion)).

The transformer model 604 is configured to extract temporal relationships or temporal correlations between the latency data of different endpoints. Due to the noise separation/extraction with the autoencoder 602, the transformer model 604 can extract the temporal relationships between the latency data of different endpoints with higher precision. Due to the noise separation/extraction with the autoencoder 602, the transformer model 604 can learn the relationships between de-noised terms and noise-signal terms from all endpoints. In some embodiments, the transformer model 604 includes a deep learning algorithm. In some embodiments, the output of the transformer model 604 includes a sequence, and the number of elements in the sequence is the same as the number of the endpoints.

The output of the transformer model 604 and the pod number data enters a concatenation calculation. The Output of the concatenation calculation is then input into a neural network layer 606. The neural network layer 606 is configured to deliver probability distribution information of latency of the endpoints (or for each endpoint). In some embodiments, the probability distribution information of latency of each endpoint includes the probability density function (PDF) of latency of each endpoint. In some embodiments, the neural network layer 606 is a fully connected neural network.

As shown in FIG. 3, there are two loss functions, loss L1 and loss L2, utilized in the training phase of the machine learning model 600.

Loss L1 takes the latency data of endpoints, which are the input of the autoencoder 602, as the ground truth data. Loss L1 takes the trend and seasonal portions of the latency data as input. Loss L1 calculates the difference between the [latency data] and the [trend data and seasonal data of the latency data]. Therefore, loss L1 corresponds to the noise term of the latency data, which is delivered by the autoencoder 602. Loss L1 is configured to let the machine learning model 600 (or the autoencoder 602) learn to adjust itself to minimize the noise term generated by the autoencoder 602. Loss L1 is configured to let the machine learning model 600 (or the autoencoder 602) learn to adjust itself to maximize the trend and seasonal portions of the latency data generated by the autoencoder 602. Therefore, the output of the autoencoder 602 (which is the input of the transformer model 604) can approach (or represent) the essential nature (or true nature) of the latency data without being biased by noise. That can help the transformer model 604 to deliver more precise temporal relationships between different endpoints.

Loss L2 takes subsequent latency data of endpoints, which are actual latency data subsequent to the latency data input into the autoencoder 602, as the ground truth data. Loss L2 takes the probability density functions of latency as input. Loss L2 is configured to let the machine learning model 600 learn to adjust itself (such as to adjust the mean and variance) to maximize the probability density function corresponding to the actual latency value for each endpoint. In this embodiment, mixture density networks (MDN) are utilized to transform the maximization process into a minimization process, by incorporating minus log calculation of the probability density function.

During the training phase, the result of loss LA and the result of loss L2 are summed up and then input to the machine learning model 600 as a feedback (or back-propagation) for the self learning or parameter adjustment of the machine learning model 600. By utilizing the summation calculation here (that is, giving the same weight to loss L1 and loss L2), we force the machine learning model 600 to learn to adjust itself to minimize the loss with greater concern as soon as possible. Since the autoencoder noise term is usually much greater than the MDN loss term (for example, for endpoints utilized in live streaming scenarios), the machine learning model 600 (or the autoencoder 602) will learn to remove noise of the latency data as soon as possible. Therefore, the transformer model 604 can deliver the temporal relationships between latencies of different endpoints in a fast and precise manner.

In some embodiments, the calculations described above (such as loss calculations) may be performed by calculating units within the server 300.

In some embodiments, a graph convolutional network (GCN) model can be incorporated into the machine learning model. For example, the output of the autoencoder can be input into the GCN model, and the output of the GCN model can be input into the transformer model. The GCN model is configured to learn spatial relationships or spatial correlations between latency data of different endpoints. For example, with a GCN model, the machine learning model can detect the correlation between gift api latency and comment api latency. That may further increase the speed and/or precision of the prediction.

Figure 4:
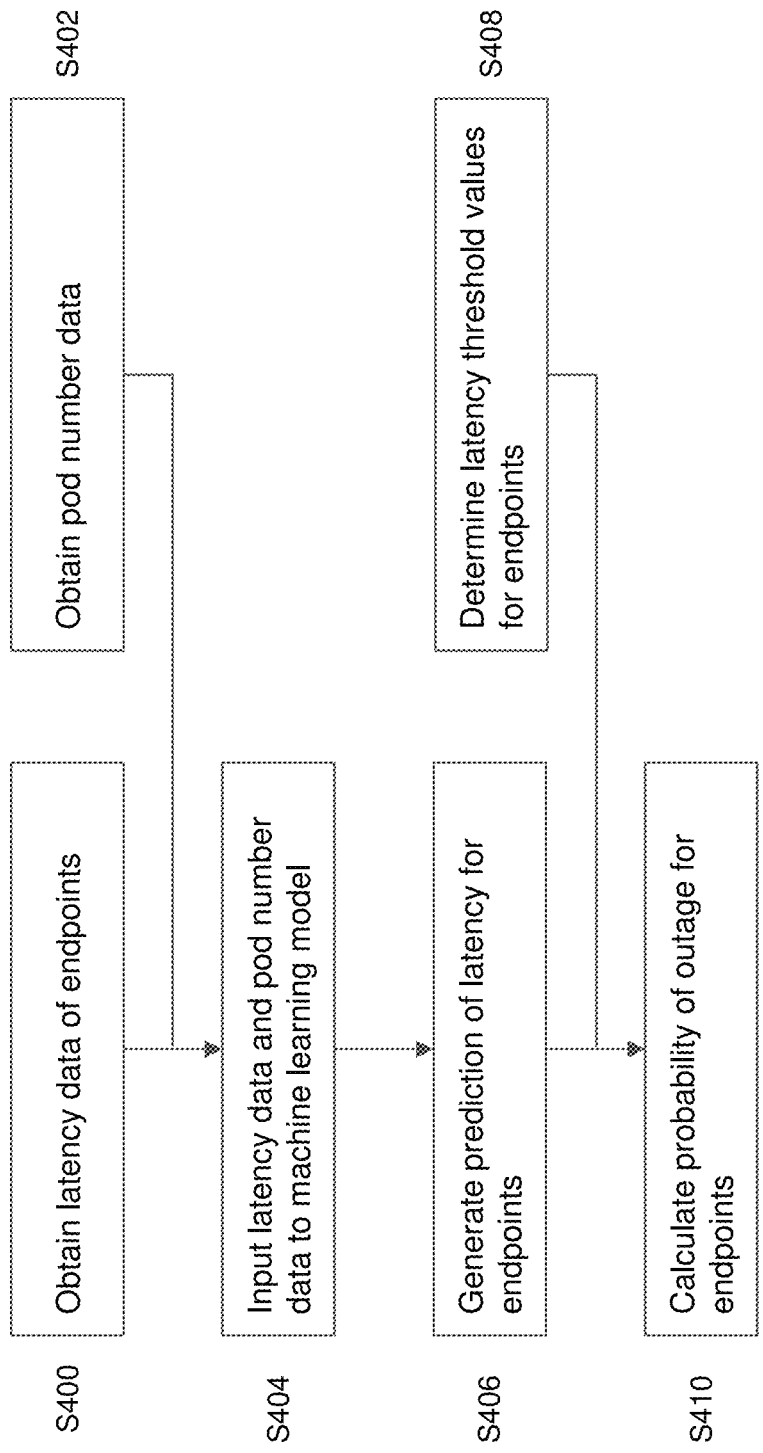
FIG. 4 shows an exemplary flow chart illustrating a method of server management in accordance with some embodiments of the present disclosure.

FIG. 4 shows an exemplary flow chart illustrating a method of server management in accordance with some embodiments of the present disclosure. The server could be, for example, the server 300 shown in FIG. 2.

In step S400, the server 300 obtains latency data or latency values of each endpoint. The process could be performed by the endpoint monitor 302. The endpoints may correspond to a live streaming service.

In step S402, the server 300 obtains pod number data (or pod amount information) corresponding to the endpoints. The process could be performed by the system monitor 304.

In step S404, the latency data and the pod number data are input into the machine learning model 306. The process could be performed by a controller within the server 300.

In step S406, the machine learning model 306 generates the prediction of latency for each endpoint. The prediction may include probability distribution information of latency for each endpoint (or probability density function of latency for each endpoint) in a future timing.

In step S408, a latency threshold value is determined for each endpoint. The threshold values may be determined by operators according to experiences or experiments. The threshold values may be determined by artificial intelligence or another machine learning model according to historical correlation data between latency value and outage for each endpoint.

In step S410, probability of outage for each endpoint is calculated according to the threshold value and the probability distribution information of latency. The process could be performed by the risk assessing unit 306. The result of step S410 could be utilized in subsequent server managing procedures such as precautions to alleviate the burden/loading of a specific endpoint.

FIG. 5 shows an example of the endpoint data table 310.

In this example, endpoint EP1 is monitored to have the time series latency value sequence [60 ms, 150 ms, 400 ms, . . . ], and endpoint EP2 is monitored to have the time series latency value sequence [1000 ms, 1300 ms, 780 ms, . . . ].

FIG. 6 shows an example of the system data table 312.

In this example, endpoints EP1 and EP2 belong to service group G1, and are allocated with or correspond to 8 pod numbers. Endpoints EP3 belongs to service group G2, and is allocated with or corresponds to 6 pod numbers. Endpoints EP4, EP5 and EP6 belong to service group G3, and are allocated with or correspond to 10 pod numbers.

Figure 7:
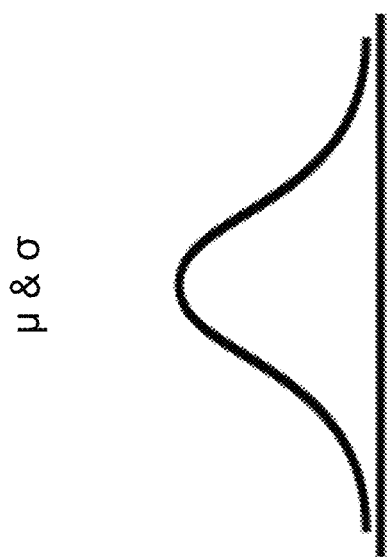
FIG. 7 shows an example of a prediction result for an endpoint stored in the prediction table 314.

FIG. 7 shows an example of a prediction result for an endpoint stored in the prediction table 314.

In this example, the prediction result includes a probability density function with its mean (μ) and standard deviation (σ) specified.

FIG. 8 shows an example of the threshold table 316.

In this example, endpoint EP1 is set to have the latency threshold value 700 ms, and endpoint EP2 is set to have the latency threshold value 1500 ms.

The present disclosure discloses improved methods and systems for quality prediction for the endpoints by considering cross impacts between different endpoints with machine learning models. The present disclosure discloses methods and systems to predict an issue of concern with past behaviors of the issue itself, which is more direct and can lead to more precise results. In some embodiments of the present disclosure, the issue of concern is latency of an endpoint. In other embodiments, the issue of concern could be other parameters or metrics of a live streaming platform.

In some embodiments, endpoints that are more sensitive to user experience may be given higher weights in the machine learning model. For example, endpoints of gift sending and/or money depositing may be given higher weights in the machine learning model. That can lead to more practical prediction results in terms of user experience.

In some embodiments, the autoencoder in the machine learning model could be a nouveau variational autoencoder (NVAE). NVAE and MDN both possess inherent Bayesian nature and can further improve the prediction accuracy.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed, but includes another variation and modification that do not disobey the present disclosure, and is the scope covered by the patent application scope.

| LIST OF REFERENCE NUMBERS | |
|---|---|
| 1 | Communication system |
| 10 | User terminal |
| 30 | Backend server |
| 40 | Streaming server |
| 90 | Network |
| 300 | Server |
| 302 | Endpoint monitor |
| 304 | System monitor |
| 306 | Machine learning model |
| 308 | Risk assessing unit |
| 310 | Endpoint data table |
| 312 | System data table |
| 314 | Prediction table |
| 316 | Threshold table |
| 500 | Kubernetes cluster |
| 502 | Pod |
| 600 | Machine learning model |
| 602 | Autoencoder |
| 604 | Transformer model |
| 606 | Neural network layer |
| L1, L2 | Loss |
| S400, S402, S404, S406 S408, S410 | Step |
| EP1, EP2, EP3, EP4, EP5, EP6 | Endpoint |
| G1, G2, G3 | Service group |

What is claimed is:

1. A method for quality prediction, comprising:
obtaining values of a parameter of a first endpoint;
obtaining values of a parameter of a second endpoint; and generating a prediction of the parameter of the first endpoint according to the values of the parameter of the first endpoint and the values of the parameter of the second endpoint;

wherein the prediction includes probability distribution information of the parameter of the first endpoint at a timing in the future;

obtaining a virtual space amount allocated to a group of endpoints, wherein the prediction of the parameter of the first endpoint is generated according to the virtual space amount, and the first endpoint and the second endpoint are included in the group of endpoints;

wherein the virtual space amount is an amount of kubernetes pods corresponding to the group of endpoints and allocated outside a server;

inputting the values of the parameter of the first endpoint, the values of the parameter of the second endpoint and the virtual space amount into a machine learning model configured to generate the prediction of the parameter of the first endpoint, wherein the machine learning model has been trained with past values of the parameter of the first endpoint, past values of the parameter of the second endpoint and past virtual space amounts;

wherein the machine learning model includes a transformer model configured to extract temporal relationship between the parameter of the first endpoint and the parameter of the second endpoint; and wherein the machine learning model includes an autoencoder configured to extract noise data, trend data and seasonal data from the values of the parameter of the first endpoint and the values of the parameter of the second endpoint, and an output of the autoencoder is taken as an input of the transformer model.

2. The method according to claim 1, wherein the parameter of the first endpoint and the parameter of the second endpoint are latency.

3. The method according to claim 1, wherein the machine learning model includes a graph convolutional network model configured to extract spatial relationship between the parameter of the first endpoint and the parameter of the second endpoint.

4. The method according to claim 1, wherein the virtual space amount is an amount of a virtual space configured to run a live-stream platform.

5. A method for quality prediction, comprising:
obtaining values of a parameter of a first endpoint;
obtaining values of a parameter of a second endpoint; and
generating a prediction of the parameter of the first endpoint according to the values of the parameter of the first endpoint and the values of the parameter of the second endpoint;

wherein the prediction includes probability distribution information of the parameter of the first endpoint at a timing in the future;

determining a threshold value for the parameter of the first endpoint; and calculating a probability of outage for the first endpoint according to the threshold value and a probability density function of the parameter of the first endpoint, wherein the probability density function is included in the probability distribution information;

obtaining a virtual space amount allocated to a group of endpoints, wherein the prediction of the parameter of the first endpoint is generated according to the virtual space amount, and the first endpoint and the second endpoint are included in the group of endpoints;

wherein the virtual space amount is an amount of kubernetes pods corresponding to the group of endpoints and allocated outside a server;

inputting the values of the parameter of the first endpoint, the values of the parameter of the second endpoint and the virtual space amount into a machine learning model configured to generate the prediction of the parameter of the first endpoint, wherein the machine learning model has been trained with past values of the parameter of the first endpoint, past values of the parameter of the second endpoint and past virtual space amounts;

wherein the machine learning model includes a transformer model configured to extract temporal relationship between the parameter of the first endpoint and the parameter of the second endpoint; and wherein the machine learning model includes an autoencoder configured to extract noise data, trend data and seasonal data from the values of the parameter of the first endpoint and the values of the parameter of the second endpoint, and an output of the autoencoder is taken as an input of the transformer model.

6. A system for quality prediction, comprising one or a plurality of processors, wherein the one or plurality of processors execute a machine-readable instruction to perform:
obtaining values of a parameter of a first endpoint;
obtaining values of a parameter of a second endpoint; and
generating a prediction of the parameter of the first endpoint according to the values of the parameter of the first endpoint and the values of the parameter of the second endpoint;

wherein the prediction includes probability distribution information of the parameter of the first endpoint at a timing in the future;

obtaining a virtual space amount allocated to a group of endpoints, wherein the prediction of the parameter of the first endpoint is generated according to the virtual space amount, and the first endpoint and the second endpoint are included in the group of endpoints;

wherein the virtual space amount is an amount of kubernetes pods corresponding to the group of endpoints and allocated outside a server;

inputting the values of the parameter of the first endpoint, the values of the parameter of the second endpoint and the virtual space amount into a machine learning model configured to generate the prediction of the parameter of the first endpoint, wherein the machine learning model has been trained with past values of the parameter of the first endpoint, past values of the parameter of the second endpoint and past virtual space amounts;

wherein the machine learning model includes a transformer model configured to extract temporal relationship between the parameter of the first endpoint and the parameter of the second endpoint; and wherein the machine learning model includes an autoencoder configured to extract noise data, trend data and seasonal data from the values of the parameter of the first endpoint and the values of the parameter of the second endpoint, and an output of the autoencoder is taken as an input of the transformer model.

* * * * *